United States Patent
Lahiri et al.

(10) Patent No.: US 9,524,299 B2
(45) Date of Patent: Dec. 20, 2016

(54) METHODS, SYSTEMS, AND COMPUTER READABLE MEDIA FOR MODELING A WORKLOAD

(71) Applicant: Ixia, Calabasas, CA (US)

(72) Inventors: Abhijit Lahiri, Kolkata (IN); Sumit Panda, Kolkata (IN); Amritam Putatunda, Singapore (SG)

(73) Assignee: IXIA, Calabasas, CA (US)

( * ) Notice: Subject to any disclaimer, the term of this patent is extended or adjusted under 35 U.S.C. 154(b) by 405 days.

(21) Appl. No.: 13/969,085

(22) Filed: Aug. 16, 2013

(65) Prior Publication Data

US 2015/0046141 A1    Feb. 12, 2015

(30) Foreign Application Priority Data

Aug. 12, 2013   (IN) .......................... 2396/DEL/2013

(51) Int. Cl.
*G06F 9/44* (2006.01)
*G06F 9/45* (2006.01)
*G06F 17/30* (2006.01)
*G06F 9/455* (2006.01)

(52) U.S. Cl.
CPC ......... *G06F 17/30067* (2013.01); *G06F 9/455* (2013.01)

(58) Field of Classification Search
USPC ....................................................... 717/134
See application file for complete search history.

(56) References Cited

U.S. PATENT DOCUMENTS

| | | | |
|---|---|---|---|
| 6,542,854 B2 | 4/2003 | Yang et al. | |
| 6,769,054 B1 | 7/2004 | Sahin et al. | |
| 6,792,393 B1 | 9/2004 | Farel et al. | |
| 7,159,184 B2 * | 1/2007 | Ullah | G06F 9/5027 711/170 |
| 7,328,134 B1 | 2/2008 | Burbidge, III et al. | |
| 7,603,372 B1 * | 10/2009 | Honicky, Jr. | G06F 11/3414 |
| 7,890,951 B2 * | 2/2011 | Vinberg | G06F 8/65 709/203 |
| 8,984,341 B1 | 3/2015 | Chandrasekharapuram et al. | |
| 9,317,252 B2 | 4/2016 | Roy et al. | |
| 2002/0087282 A1 | 7/2002 | Millard | |

(Continued)

FOREIGN PATENT DOCUMENTS

WO    WO 2014/160660 A1    10/2014

OTHER PUBLICATIONS

Notification of Transmittal of the International Search Report and the Written Opnion of the International Searching Authority, or the Declaration for PCT International Application No. PCT/US2014/045658 (Oct. 30, 2014).

(Continued)

*Primary Examiner* — Marina Lee
(74) *Attorney, Agent, or Firm* — Jenkins, Wilson, Taylor & Hunt, P.A.

(57) ABSTRACT

Methods, systems, and computer readable media for modeling a workload are disclosed. According to one method, the method occurs at a computing platform. The method includes providing for user configuration of a file system associated with a device under test (DUT), providing for user configuration of at least one emulated user, and providing for user configuration of interaction behavior between the at least one emulated user and the file system.

17 Claims, 6 Drawing Sheets

(56) References Cited

U.S. PATENT DOCUMENTS

| | | | |
|---|---|---|---|
| 2002/0184614 A1 | 12/2002 | Davia et al. | |
| 2003/0036897 A1* | 2/2003 | Flores | G06F 11/3414 703/22 |
| 2003/0154432 A1 | 8/2003 | Scott et al. | |
| 2003/0182408 A1* | 9/2003 | Hu | G06F 11/3414 709/223 |
| 2004/0015600 A1 | 1/2004 | Tiwary et al. | |
| 2004/0021678 A1* | 2/2004 | Ullah | G06F 9/5027 715/700 |
| 2004/0139437 A1 | 7/2004 | Arndt | |
| 2005/0216234 A1 | 9/2005 | Glas et al. | |
| 2006/0025985 A1* | 2/2006 | Vinberg | G06F 8/65 703/22 |
| 2006/0037002 A1* | 2/2006 | Vinberg | G06F 8/65 717/124 |
| 2007/0067374 A1 | 3/2007 | Iketani et al. | |
| 2007/0069005 A1 | 3/2007 | Dickerson et al. | |
| 2007/0112549 A1* | 5/2007 | Lau | G06F 11/3414 703/13 |
| 2008/0208554 A1* | 8/2008 | Igarashi | G06F 17/5022 703/14 |
| 2008/0221857 A1 | 9/2008 | Casotto | |
| 2009/0089038 A1 | 4/2009 | Nadgir et al. | |
| 2009/0259704 A1 | 10/2009 | Aharoni et al. | |
| 2010/0111494 A1 | 5/2010 | Mazzaferri | |
| 2010/0153529 A1* | 6/2010 | Moser | H04L 12/2697 709/223 |
| 2010/0161864 A1 | 6/2010 | Barde et al. | |
| 2011/0066786 A1 | 3/2011 | Colbert | |
| 2011/0246171 A1 | 10/2011 | Cleeton et al. | |
| 2012/0054740 A1 | 3/2012 | Chakraborty et al. | |
| 2012/0060167 A1* | 3/2012 | Salsburg | G06F 9/50 718/104 |
| 2012/0192182 A1 | 7/2012 | Hayward et al. | |
| 2012/0311387 A1 | 12/2012 | Santhosh et al. | |
| 2013/0013657 A1 | 1/2013 | Emelko et al. | |
| 2013/0055026 A1 | 2/2013 | Hatano et al. | |
| 2013/0282354 A1 | 10/2013 | Sayers et al. | |
| 2013/0297769 A1 | 11/2013 | Chang et al. | |
| 2014/0006358 A1 | 1/2014 | Wang et al. | |
| 2014/0013306 A1 | 1/2014 | Gounares et al. | |
| 2014/0047272 A1 | 2/2014 | Breternitz et al. | |
| 2014/0067940 A1 | 3/2014 | Li et al. | |
| 2014/0068335 A1 | 3/2014 | Bromley et al. | |
| 2014/0108001 A1* | 4/2014 | Brown | G06F 11/3664 703/23 |
| 2014/0298335 A1 | 10/2014 | Regev et al. | |
| 2014/0378057 A1 | 12/2014 | Ramon et al. | |
| 2015/0046141 A1* | 2/2015 | Lahiri | G06F 17/30067 703/13 |
| 2015/0120797 A1 | 4/2015 | Roy et al. | |
| 2015/0135178 A1 | 5/2015 | Fischer et al. | |
| 2015/0140956 A1* | 5/2015 | Prewitt, II | H04W 24/06 455/405 |
| 2015/0293826 A1 | 10/2015 | Sincan et al. | |
| 2016/0034372 A1* | 2/2016 | Panda | G06F 11/2205 714/33 |

OTHER PUBLICATIONS

Notification of Transmittal of the International Search Report and the Written Opnion of the International Searching Authority, or the Declaration for PCT International Application No. PCT/US2014/031637 (Jul. 31, 2014).

Commonly-assigned, co-pending International Patent Application No. PCT/US2014/031637 for "Methods, Systems, and Computer Readable Media for Emulating Virtualization Resources," (Unpublished, filed Mar. 24, 2014).

"IxLoad: Specifications," https://web.archive.org/web/20130901094417/http://www.ixlacom.com/products/network_test/applications/ixload/specifications/index.php, pp. 1-5 (Sep. 1, 2013).

"IxLoad" Ixia, Solution Brief, pp. 1-4 (Feb. 2012).

Final Office Action for U.S. Appl. No. 14/224,024 (Jun. 15, 2016).

Communication of European publication number and information on the application of Article 67(3) EPC for European Application No. 14836839.2 (May 25, 2016).

Applicant-Initiated Interview Summary for U.S. Appl. No. 14/224,024 (May 13, 2016).

Notice of Allowance and Fee(s) Due for U.S. Appl. No. 14/445,921 (May 12, 2016).

Non-Final Office Action for U.S. Appl. No. 14/251,547 (Apr. 26, 2016).

Applicant-Initiated Interview Summary for U.S. Appl. No. 14/445,921 (Apr. 14, 2016).

Non-Final Office Action for U.S. Appl. No. 14/224,024 (Feb. 3, 2016).

Corrected Notice of Allowability for U.S. Appl. No. 14/158,659 (Jan. 11, 2016).

Notice of Allowance and Fee(s) Due for U.S. Appl. No. 14/158,659 (Dec. 11, 2015).

Non-Final Office Action for U.S. Appl. No. 14/445,921 (Jan. 14, 2016).

Commonly-assigned, co-pending U.S. Appl. No. 14/749,606 for "Methods, Systems, and Computer Readable Media for Emulating Computer Processing Usage Patterns on a Virtual Machine," (Unpublished, filed Jun. 24, 2015).

"IxVM: Validating Virtualized Assets and Environments," Ixia, Data Sheet, pp. 1-8 (Jun. 2015).

"Fisher-Yates Shuffle," http://en.wikipedia.org/wiki/Fisher-Yates_shuffle, pp. 1-11, (May 8, 2014).

"ImpairNetTM—EIM1G4S, EIM10G4S, and EIM40G2Q Ethernet Impairment Load Module," pp. 1-5, (Jul. 2013).

* cited by examiner

METHODS, SYSTEMS, AND COMPUTER READABLE MEDIA FOR MODELING A WORKLOAD

PRIORITY CLAIM

This application claims the benefit of Indian Provisional Patent Application No. 2396/DEL/2013, filed Aug. 12, 2013; the disclosure of which is incorporated herein by reference in its entirety.

TECHNICAL FIELD

The subject matter described herein relates to testing devices. More specifically, the subject matter relates to methods, systems, and computer readable media for modeling a workload.

BACKGROUND

When testing various devices, it is important to make sure that testing mimics real world scenarios and conditions. For example, when testing storage devices, it may be necessary to mimic a typical workload (e.g., an amount of work that is processed or handled by a device under test (DUT)). Conventional testing devices may provide predefined workloads for testing purposes. However, such workloads are limited and generally do not cover all scenarios that customers (e.g., storage device manufacturers or service providers) may want to test. Further, while some conventional testing devices may allow a customer to modify a predefined workload, modifying a predefined workload is typically cumbersome and time intensive.

Accordingly, in light of these difficulties, a need exists for improved methods, systems, and computer readable media for modeling a workload.

SUMMARY

Methods, systems, and computer readable media for modeling a workload are disclosed. According to one method, the method occurs at a computing platform. The method includes providing for user configuration of a file system associated with a device under test (DUT), providing for user configuration of at least one emulated user, and providing for user configuration of interaction behavior between the at least one emulated user and the file system.

According to one system, the system includes a computing platform. The computing platform includes at least one processor and memory. The system also includes a workload module utilizing the at least one processor and the memory. The workload module is configured to provide for user configuration of a file system associated with a DUT; to provide for user configuration of at least one emulated user, and to provide for user configuration of interaction behavior between the at least one emulated user and the file system.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for modeling a workload. When testing one or more devices, it may be desirable to model a workload such that a number of users and their related interactions with the device(s) under test (DUT) are emulated.

In accordance with some aspects of the subject matter described herein, a workload may be represented by one or more configurable objects (e.g., an object may be code or software related to performing or emulating one or more aspects associated with workload modeling or workload emulation). For example, a workload object may include a file system object, one or more user profile objects, and an access object. In this example, modeling a workload or configuring a workload object may include configuring each of the sub-objects. In some embodiments, a user interface (UI) may allow a workload user (e.g., a test operator) to configure each object. After configuring the various objects, a computing platform or device may instantiate or initialize the objects so as to emulate the workload.

In accordance with some aspects of the subject matter described herein, workload objects and/or related sub-objects may be stored and/or used for future workload modeling or emulation. For example, a workload modeling system may include 20 file system objects, 15 user profile objects, and 12 access objects. In this example, a workload operator may mix and match the objects to create one of 3600 (e.g., 20×15×12=3600) different possible predefined workloads. Further, via customization (e.g., via a user interface), the number of unique workloads generated using workload-related objects may be countless. Hence, by representing workload using one or more objects, workloads may be modeled efficiently for a variety of scenarios, environments, and/or customers.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
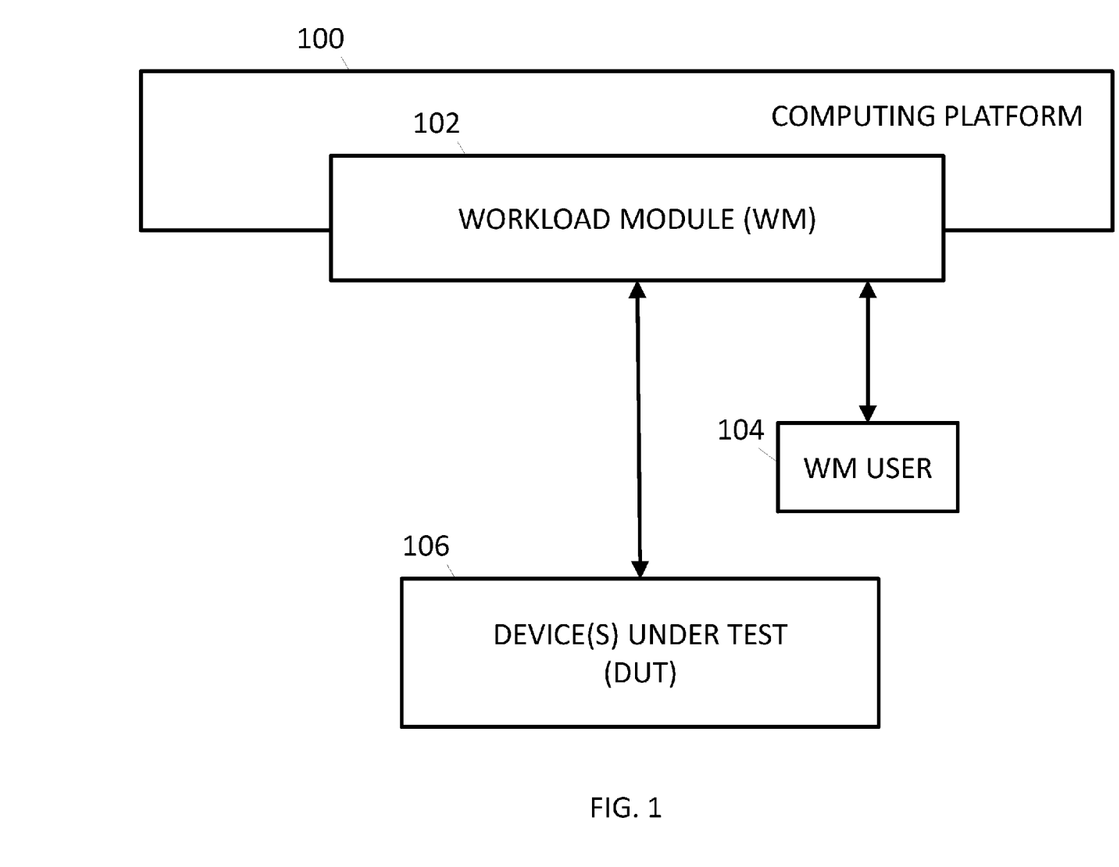
FIG. 1 is a diagram illustrating an exemplary computing platform for modeling a workload according to an embodiment of the subject matter described herein.

FIG. 1 is a diagram illustrating an exemplary computing platform 100 for modeling a workload according to an embodiment of the subject matter described herein. Computing platform 100 may represent any suitable entity or entities (e.g., a testing platform or a server farm) for modeling and/or emulating a workload. For example, computing platform 100 may model a workload associated with a Windows Server file system, where a 1000 concurrent emulated users request an assorted mix of portable document (PDF) files, Word document (DOC) files, and PowerPoint (PPT) files.

In some embodiments, computing platform 100 may be configured to perform one or more aspects associated with testing DUT 106. In some embodiments, computing platform 100 may be a stand-alone tool, a testing device, or software executing on a processor. In some embodiments, computing platform 100 may be a single node or may be distributed across multiple computing platforms or nodes.

Computing platform 100 may include a workload module (WM) 102. WM 102 may be any suitable entity (e.g., software executing on a processor) for performing one or more aspects associated with workload modeling and/or emulation. WM 102 may include functionality for generating or modeling a workload using one or more objects. For example, WM 102 may provide one or more workload-related objects (e.g., file system objects, user profile objects, access objects) for selection and/or customization via a user interface. In this example, a WM user 104 (e.g., a device or computing platform usable by a user or a test operator) may configure one or more objects via the user interface. In addition to providing functionality for selection and/or configuration of workload-related objects, WM 102 may include functionality for storing the objects for future use. In some embodiments, WM 102 may include functionality for instantiating or initializing objects and/or for providing the objects to other computing platforms or devices. For example, WM 102 may use workload-related objects to emulate a workload or may provide the workload-related objects to other nodes that emulate the workload.

In some embodiments, WM 102 may include or access data storage containing information related to workload modeling or emulation. For example, WM 102 may access data storage containing workload objects, file system objects, user profile objects, access objects, profiles, settings, or configurations. Exemplary data storage may include non-transitory computer readable media, such as flash memory, random access memory, or other storage devices. In some embodiments, data storage may be external to and/or or integrated with computer platform 100 and/or WM 102.

In some embodiments, WM 102 may include one or more communications interfaces for interacting with users and/or nodes. For example, WM 102 may provide a communications interface for communicating with WM user 104. In some embodiments, WM user 104 may be an automated system or may be controlled or controllable by a human user. WM user 104 may select and/or configure one or more workload-related objects for modeling and/or emulation of a workload.

In some embodiments, WM 102 may include one or more communications interfaces for interacting with one or more devices under test (DUT) 106. DUT 106 may be any suitable entity or entities (e.g., storage devices or filers) implementing, accessing, or otherwise using a workload or workload-related objects. For example, DUT 106 may be an enterprise data storage system including multiple physical storage devices or components. DUT 106 may communicate with one or more emulated users associated with a workload or workload-related objects. For example, WM 102 may be configured to emulate 500 users that request multiple files from DUT 106. In this example, DUT 106 may respond by processing file requests and providing the files when appropriate and providing error messages or discarding the requests when inappropriate.

In some embodiments, WM 102 may include functionality to set up a workload for testing DUT 106. For example, WM 102 may be configured to generate content (e.g., files and directories) associated with a workload and may send or provide the content to DUT 106. After set up, DUT 106 may provide the generated content to emulated users, e.g., during a testing period. For example, WM 102 or another module may emulate a workload associated with the content (e.g., emulated users may request some content, save additional content, and/or deleted some content).

In some embodiments, WM 102 may be configured to model and/or emulate a workload based on existing content, e.g., at DUT 106. For example, during workload modeling, WM user 104 may import an existing file system and/or content. In this example, a workload may be modeled such that emulated users request, access, or modify existing content at DUT 106.

Figure 2:
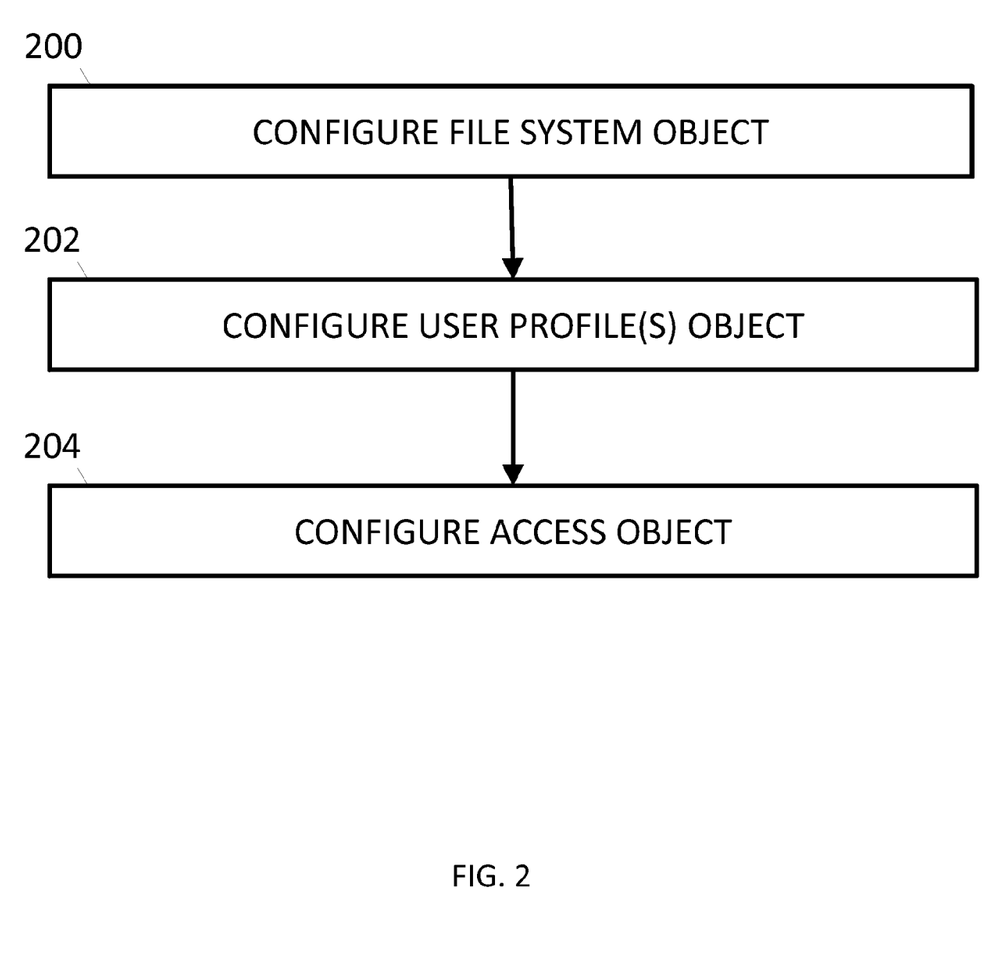
FIG. 2 is a diagram illustrating an exemplary process for configuring a workload object according to an embodiment of the subject matter described herein.

FIG. 2 is a diagram illustrating an exemplary process for configuring a workload object according to an embodiment of the subject matter described herein. In some embodiments, a workload object may include distinct or separate, interconnected workload-related objects, such as a file system object, a user profile object, and an access object. Each of the interconnected objects may define, implement, or otherwise describe an aspect of a workload. For example, a file system object may represent a file system and content of which emulated users interact, a user profile object may represent one or more emulated users, and an access object may represent actions, command, and/or other behavior associated with interactions between emulated users and a file system.

In the embodiment illustrated in FIG. 2, configuring a workload object may include steps 200, 202, and/or 204. At step 200, a file system object may be configured. For example, WM user 104 may use a user interface to select a profile associated with a preconfigured or stored file system object. The preconfigured file system object may include a particular file system and may include specific files with particular file types and file size characteristics. In some embodiments, a file system object may include default values, e.g., a default maximum file size setting may be set at 100 MB. In this example, WM user 104 may use the user interface to customize a preconfigured file system object or may use a preconfigured file system object with its default values. In another example, a file system object may be based on information from an existing file system (e.g., a file system currently residing on DUT 106). In this example, WM user 104 may be able to customize the existing file system, e.g., WM 102 may analyzed an existing file system and provide, via a user interface, options or settings that may modify the existing file system.

At step 202, one or more user profile objects may be configured. For example, WM user 104 may use a user interface to select a profile associated with a preconfigured or stored user profile object. The preconfigured user profile object may include a particular user type (e.g., a high bandwidth user or a high transaction user) and may include various characteristics associated with the particular user type. In some embodiments, a user profile object may include default values, e.g., a default maximum concurrent user setting may be set at 100. In this example, WM user 104 may use the user interface to customize a preconfigured user profile object or may use a preconfigured user profile with its default values.

In some embodiments, multiple user profile objects may be configured. For example, WM user 104 may configure different user profile objects to access different portions of a file system object. In another example, different user profile objects may be configured for different testing phases.

At step 204, an access object may be configured. For example, WM user 104 may use a user interface to select a profile associated with a preconfigured or stored access object. The access object may include particular access and interaction behavior, such as commands, user privileges, and/or various characteristics. In some embodiments, an access object may include default values, e.g., a default percentage of frequency of read access to write access setting may be set at 85%. In this example, WM user 104 may use the user interface to customize a preconfigured access object or may use a preconfigured access object with its default values.

In some embodiments, WM 102 may include presentation intelligence such that certain profiles, settings, options, or configurations are available depending on previous interactions. For example, if WM user 104 selects a file system object representing a Windows Server file system, WM 102 may only provide, via a user interface, user profile objects, access objects, and/or default values for said objects that are Windows compatible.

In some embodiments, each file system object may include a default user profile and/or a default access object. For example, an enterprise file system object may be associated with a high transactions user profile object and a default access object. In some embodiments, default associations may be predetermined and/or configurable.

Figure 3:
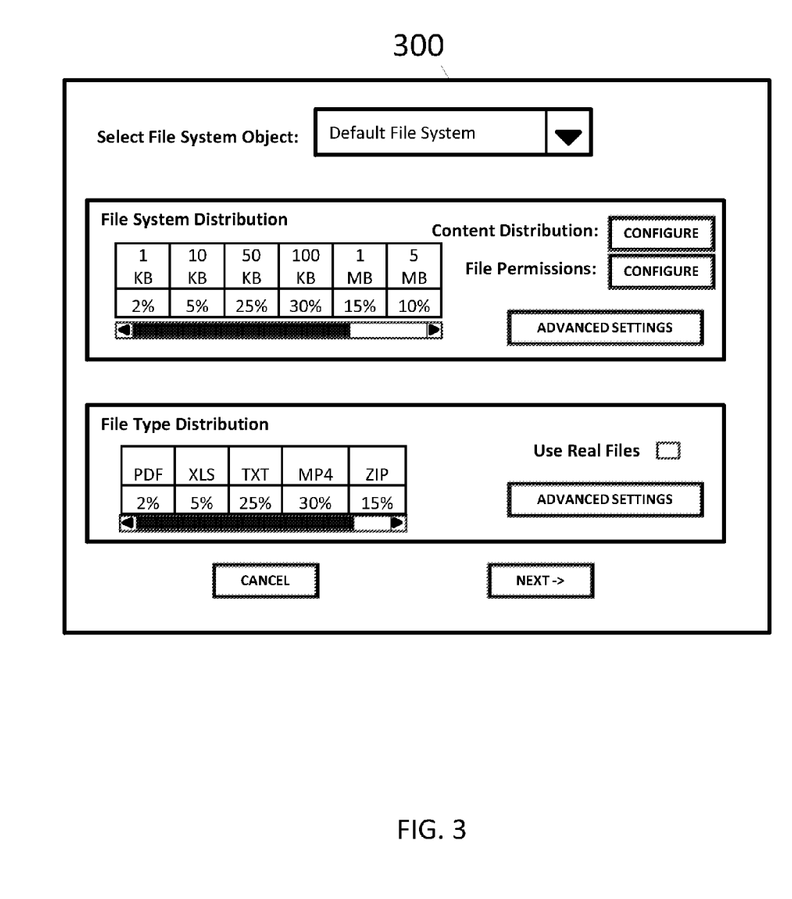
FIG. 3 is a diagram illustrating an exemplary user interface for configuring a file system object according to an embodiment of the subject matter described herein.

FIG. 3 is a diagram illustrating an exemplary user interface for configuring a file system object according to an embodiment of the subject matter described herein. In some embodiments, WM 102 and/or associated module or node may include a graphical user interface (GUI) for modeling a workload and/or configuring workload-related objects. In some embodiments, configuring a workload object may include configuring a file system object.

File system objects may represent a variety of different file systems. For example, an exemplary file system object may represent an enterprise file system, a data center file system, an engineering file system, a video and/or voice file system, a Microsoft Office productivity tool or file system, a file system containing a thousand small files, or a cache control file system.

In some embodiments, a file system object may represent a data set having settings or configurations associated with a directory structure, files, access permissions, and/or file content. For example, a file system object may include information about files stored on DUT 106 or information about files that will be stored on DUT 106. Using this information, WM 102 or another module may generate a corresponding file system including files and directories for DUT 106.

In the embodiment illustrated in FIG. 3, exemplary screenshot 300 illustrates some settings or configurations associated with configuring a file system object. Screenshot 300 may depict user interface elements for selecting a profile associated with a file system object. For example, a drop down menu box may allow a user to select one profile (e.g., a default file system) from a plurality of predetermined (e.g., previously stored user-defined profiles or factory-set) profiles. Each profile may be associated with numerous settings or configurations. For example, after selecting "Default File System" from a drop down menu box, a default file system distribution and a default file content distribution may be displayed.

In some embodiments, configuring a file system object may include configuring file size, file content, file types, distribution patterns (e.g., location of data), and/or metadata content. In some embodiments, configuring file size, file content, and/or metadata content may be performed via percentages or proportions. For example, a data set may be represented in the form of a consolidated list of X files, $X=\text{sum}(a+b+c+ \ldots +n)$, where file sizes follow percentage distributions. By using distribution tables and/or other similar configuration procedures, WM 102 or another module may efficiently configure a file system object regardless of the number of individual files.

TABLE 1

| 1 KB | 10 KB | 50 KB | 100 KB | 1 MB | 5 MB | 10 MB | 100 MB | 1 GB |
|---|---|---|---|---|---|---|---|---|
| 2% | 5% | 25% | 30% | 15% | 10% | 5% | 5% | 3% |

Table 1 above depicts a distribution table for indicating percentages or proportions of files in a file system object having particular characteristics, e.g., certain file sizes or size ranges. As indicated in Table 1, a particular file system object may include a data set where 2% of files in the data set are 1 kilobyte (KB), 5% of files in the data set are 10 KBs, 25% of files in the data set are 50 KBs, 30% of files in the data set are 100 KBs, 15% of files in the data set are 1 megabyte (MB), 10% of files in the data set are 5 MBs, 5% of files in the data set are 10 MBs, 5% of files in the data set are 100 MBs, and 3% of files in the data set are 1 gigabyte (GB).

In some embodiments, file type distribution may also be configurable, e.g., using distribution tables. For example, as depicted in screenshot 300, a particular file system object may include a data set where 2% of files in the data set are a PDF file type, 5% of files in the data set are an Excel (XLS) file type, 25% of files in the data set are a text (TXT) file type, 30% of files in the data set are an MPEG-4 Part 14 (MP4) file type, and 15% of files in the data set are an archive or compressed (ZIP) file type.

In some embodiments, distribution or location of file content (e.g., in relation to physical storage devices) may be configurable. For example, a user may be able to configure variable and/or realistic patterns of content. In some embodiments, file content distributions may be associated with different user environments, such as specific enterprise data storage environments, data center environments, or big data, cluster processing (e.g., Google®-like) environments.

In some embodiments, configuring various aspects of a file system object may include configuring individual components, e.g., certain files or folders associated with a represented file system. For example, WM user 104 may configure some files associated with a file system object to have higher restrictions (e.g., restricted access privileges) than other files.

In some embodiments, after configuring various aspects of a file system object, content may be generated. For example, content may be created using content generation software. In this example, content for a file system may be generated based on various settings and/or configurations associated with a corresponding file system object.

In some embodiments, configuring a file system object may include a set up phase for generating content and/or providing the content to DUT 106 or other destination. For example, WM user 104 may configure a file system object and may enable or disable a set up phase for installing a file system corresponding to the file system object on DUT 106.

In some embodiments, enabling a set up phase may include creating a file system that contains real (e.g., pre-stored or sample files) or synthetic (e.g., computer-generated files) files and installing or setting up the file system.

In some embodiments, after performing a set up phase or configuring a file system object to use an existing file system on DUT 106, additional configurations may be possible, e.g., configuring a user profile object or an access object.

In some embodiments, disabling a set up phase may include creating a file system that contains real (e.g., predefined, sample files) or synthetic (e.g., computer-generated files) files and installing or setting up the file system at a later time. For example, a file system may be created and stored (e.g., on a network or in memory at WM 102) until the created file system is installed at DUT 106.

In some embodiments, WM 102 or another module may generate scalable file system content. For example, if a scalable file system is to be generated, one hundred or more files with file sizes between 512 bytes and 1024 bytes may be created. In some embodiments, the generated file system may be usable for testing a variety of scenarios including where emulated users access or download a large number of files in short periods of time (e.g., a large number of transactions per seconds), where emulated users concurrently access files, or where emulated users use several metadata commands.

In some embodiments, a scalable file system may be compatible with user profile objects associated with a large number of transactions per second, scalability, concurrent file access, file locking, and/or backup operations.

In some embodiments, WM 102 or another module may generate distributed file system content. For example, if a distributed file system is to be generated, file having multiple files sizes may be distributed across the file system (e.g., among different physical storage devices) with a particular percentage of files in the file system having a particular file size. In some embodiments, a distributed file system may be distributed per user such that each user has its own file system. A distributed per user file system may require a longer set up time depending on the number of users. In some embodiments, a distributed file system may be scattered such that the file system is distributed across DUT 106 and different users may access differently sized files. As such, the scattered file system may be used for testing simultaneous access from various portions of DUT 106, e.g., emulated users 1-10 may access 1 KB files on disk A, emulated users 11-20 may access 10 KB files on disk B, and so on.

In some embodiments, a distributed file system may be compatible with user profile objects associated with a large number of transactions per second, scalability, concurrent file access, high bandwidth usage, and/or cloud services (e.g., file access via Dropbox®).

In some embodiments, WM 102 or another module may generate high bandwidth file system content. For example, if a high bandwidth file system is to be generated, files with file sizes between 100 MB and 1 GB may be created. In some embodiments, a high bandwidth file system may include many similar aspects of a scalable file system. As such, the generated file system may be useable for testing a variety of scenarios including where emulated users perform a large number of transactions per second, where emulated users concurrently access files, or where emulated users use several metadata commands.

In some embodiments, a high bandwidth file system may be compatible with user profile objects associated with concurrent file access, high bandwidth usage, file locking, and/or backup operations.

In some embodiments, WM 102 or another module may generate data center file system content. For example, if a data center file system is to be generated, system and content may emulate a server message block (SMB) 3.0 or a parallel network file system (pNFS) implementation.

In some embodiments, WM 102 or another module may generate operating system (OS) based file system content. For example, if a Windows Server file system is to be generated, common Windows-related files (e.g., DOC files, XLS files, PDF files, and PPT files) may be created. In another example, predetermined files (e.g., sample or real files) may be stored and may be copied during a set up phase or at runtime. In other example, Linux based file systems and/or MAC based file systems may also be configured and created.

In some embodiments, an OS based file system may be compatible with user profile objects associated with a large number of transactions per second, scalability, concurrent file access, high bandwidth usage, and/or cloud services.

In some embodiments, WM 102 or another module may generate media file system content. For example, if a media file system is to be generated, common media files (e.g., MP3 files, MP4 files, and AVI files) may be created. In another example, predetermined media files (e.g., sample or real files) may be stored and may be copied during a set up phase or at runtime.

In some embodiments, a media file system may be compatible with user profile objects associated with a large number of transactions per second, scalability, concurrent file access, high bandwidth usage, and/or cloud services.

In some embodiments, WM 102 or another module may generate "negative" file system content. For example, if a "negative" file system is to be generated, files associated with negative or potentially dangerous (e.g., system crashing) test cases may be created, such as files with no permissions or other irregularities.

In some embodiments, a "negative" file system may be compatible with user profile objects associated with problematic test cases.

In some embodiments, configuring a file system object may include configuring content generation. For example, configuring content generation may include determining content distribution and whether content is repeated in a file system, e.g., some files may be generated and then copied into multiple directories. In some embodiments, configuring content generation may include determining whether data integrity is verifiable for generated content.

In some embodiments, configuring a file system may include configuring content distribution. For example, content distribution may include how and/or where content is stored. Some exemplary contribution types may attempt to mimic real world file systems. For example, a realistic distribution may include storing video and music files in a particular directory and text files in other directories. In another example, a realistic distribution may be associated with disk or data block locations, where files are interspersed among non-file data blocks of DUT 106.

In some embodiments, content distribution types may be associated with data storage patterns. For example, a content distribution type for data verifiable content may be associated with synthetic patterns. A synthetic pattern may be associated with storing files in a precise manner (e.g., a set of data blocks between each file of a file system). In another example, various dummy data patterns may be used for high performance. For example, a dummy data pattern may store files on flash drives or may place files using a pseudo-random distribution. In yet another example, WM user 104 may define particular patterns and/or use existing or real file content patterns.

In some embodiments, WM 102 or another module may use pre-packaged or predetermined content, e.g., in lieu of generating content. For example, sample files may be stored in memory accessible to WM 102. After configuring a file system object, WM 102 or another module may modify predetermined content and/or may otherwise arrange content (e.g., based on a configured content distribution pattern). For example, content distribution for pre-packaged real files may be undetermined prior to user selection and/or configuration. In this example, after selecting predetermined content, WM user 104 may configure a content distribution type for the predetermined content, such as per user or scattered. In some embodiments, content distribution may be based on percentages. For example, a percentage of content for a file system may be distributed based on file type, file size, and/or file location.

In some embodiments, WM 102 or another module may use existing file content or user imported content, e.g., in lieu of generating content. For example, WM 104 may import a file system when configuring a file system object. In this example, WM user 104 may use the imported file system to create a particular testing environment (e.g., to mirror a deployed solution) and/or for verifying file system backups.

In some embodiments, configuring a file system object may include configuring file and/or folder permissions. For example, WM user 104 may configure file permissions for a subset of files associated with a file system object, wherein certain files are readable, but not writable and other files are both readable and writable. In some embodiments, content distribution may be based on file permissions. For example, a first percentage of content may include content with a first set of permissions (Group A=10%) and a second percentage of content may include a second set of permissions (Group B=90%).

Figure 4:
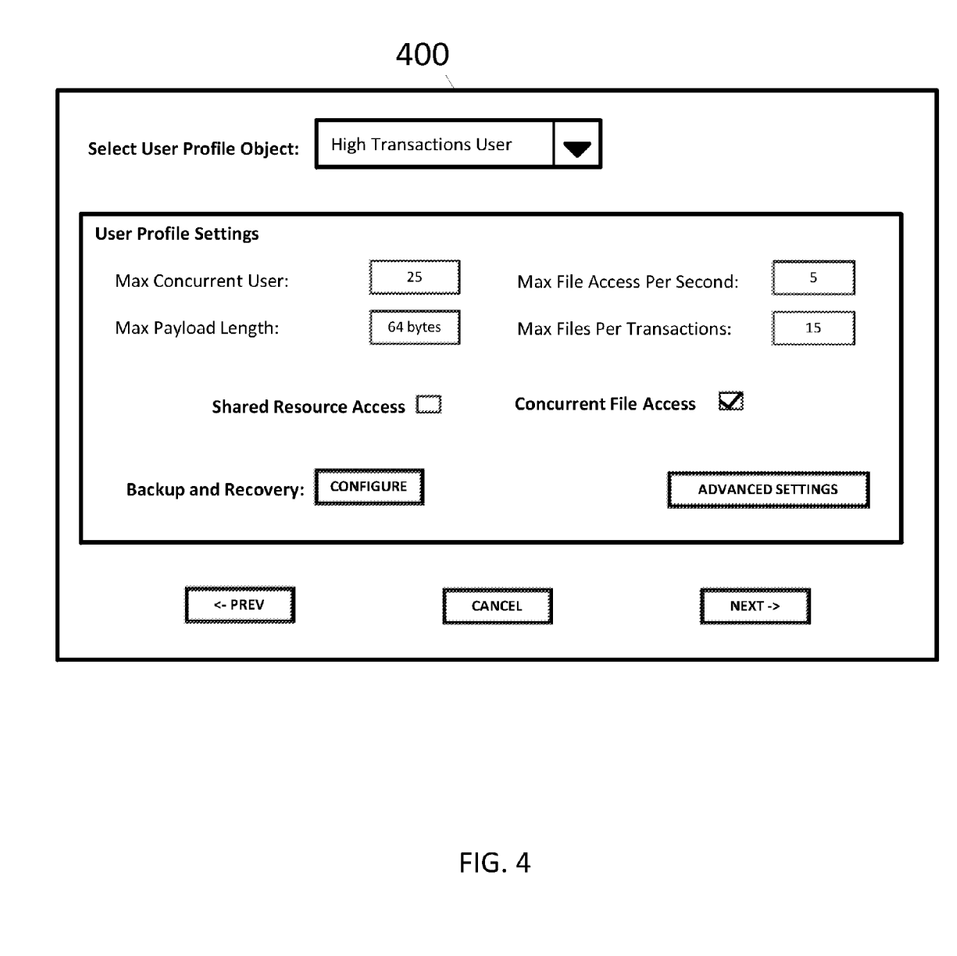
FIG. 4 is a diagram illustrating an exemplary user interface for configuring a user profile object according to an embodiment of the subject matter described herein.

FIG. 4 is a diagram illustrating an exemplary user interface for configuring a user profile object according to an embodiment of the subject matter described herein. In some embodiments, WM 102 and/or associated module or node may include a graphical user interface (GUI) for modeling a workload and/or configuring workload-related objects. In some embodiments, configuring a workload object may include configuring one or more user profile objects.

User profiles objects may represent a variety of different users. For example, an exemplary user profile object may represent a high bandwidth user, a high transactions user, a backup user, a negative user, or a scalable user.

In some embodiments, a user profile object may represent an emulated user or a set of emulated users. For example, a high bandwidth user profile may represent a number of emulated users for requesting large media files (e.g., 100 MB-1 GB files) from DUT 106. Using this information, WM 102 or another module may emulate actions associated with a particular user profile object.

In some embodiments, a user profile object may define a user base for a file system (represented by a file system object) and may include characteristics and/or other information associated with accessing or interacting with the file system. For example, a user profile object may be configured to allow each emulated users to access separate files or may indicate that multiple users may access the same files.

In the embodiment illustrated in FIG. 4, exemplary screenshot 400 illustrates some settings or configurations associated with configuring a user profile object. Screenshot 400 may depict user interface elements for selecting a profile associated with a user profile object. For example, a drop down menu box may allow a user to select one profile (e.g., a high transactions user) from a plurality of predetermined (e.g., previously stored user-defined profiles or factory-set) profiles. Each profile may be associated with numerous settings or configurations. For example, after selecting "High Transactions User" from a drop down menu box, default values for a variety of settings may be displayed.

In some embodiments, configuring a user profile object may include configuring a maximum number of concurrent users, configuring a maximum payload length (e.g., for command packets), configuring a maximum number of file accesses per second, and/or configuring a maximum number of files accessible per transaction.

In some embodiments, configuring a user profile object may include configuring a relationship between a number of users and a number of files in a file system. For example, WM user 104 may select a unique user count setting when configuring a user profile object. If a unique user count setting is selected then WM 102 or another module may emulate as many users as files in an associated file system so as to ensure single file access per user.

In some embodiments, settings and/or configurations for a user profile object may be related to or based on other workload-related objects. For example, when configuring a user profile object, a maximum value associated with a user count setting may be based on a maximum number of users supported by a select file system object. In this example, WM user 104 may reduce a user count setting below a maximum value supported by the selected file system but may not increase the user count setting above the maximum number of users supported by the selected file system without modifying a corresponding file system object to increase the maximum number of users supported.

In some embodiments, a user profile object may include configurations, settings, and/or characteristics associated with a maximum concurrency scenario involving DUT 106. A "maximum concurrency" user profile may be useful for showcasing a large number of users concurrently accessing a file system.

In some embodiments, a user profile object may include configurations, settings, and/or characteristics associated with a maximum threshold scenario involving DUT 106. A "maximum threshold" user profile may be usable for achieving a maximum threshold or throughput rate associated with DUT 106. Using a "maximum threshold" user profile, WM 102 or another module may be configured to emulate a number of users accessing large sized files.

In some embodiments, a user profile object may include configurations, settings, and/or characteristics associated with a high transaction scenario involving DUT 106. A "high transactions" user profile may be usable for achieving a maximum transaction rate associated with DUT 106. To provide a high transaction rate, a "high transaction" user profile object may include settings and configurations (e.g., a 64 bit payload length) that allow emulated users to perform quick, small transaction operations so as to support a large total number of transactions occurring across DUT 106.

In some embodiments, a user profile object may include configurations, settings, and/or characteristics associated with a maximum scalability or a sticky user scenario involving DUT 106. A "maximum scalability or sticky user" user profile may be usable for testing operations by a single user on a same file for an extended period of time. For example, user 1 may access file 'A' and user 2 may access file 'B', and so on. Using this type of user profile, a maximum number of files that can be accessed in parallel may be determined for DUT 106.

In some embodiments, a user profile object may include configurations, settings, and/or characteristics associated with a staggered or stepped up scalability scenario involving DUT 106. A "staggered scalability" user profile may be usable for testing increasing larger number of operations on a same file or different files. For example, a test target or goal may be to reach 10,000 parallel file accesses. Using a "staggered scalability" user profile, WM 102 or another module may be configured to emulate users so as to increase file accesses by a 100 each second until the target is reached or exceeded.

In some embodiments, a user profile object may include configurations, settings, and/or characteristics associated with a backup scenario involving DUT 106. A "backup" user profile may be usable for testing backup operations associated with a file system. For example, a file system may be backed up from one server to another server. A "backup" user profile may be configured to perform a data integrity check. For example, using a "backup" user profile, WM 102 or another module may be configured to emulate a user that performs a "scan-all" command of the backup file system, where the "scan-all" command may check for the existence of all the files, their sizes, and may also allow content matching.

In some embodiments, configuring a backup user profile object may include selecting a file system object having predetermined content. For example, WM user 104 may specify that a backup have the same files as a predetermined "file system object X". In this example, the predetermined file system object need not be created but may just be downloaded and compared with files and directories that should have been created.

In some embodiments, a user profile object may include configurations, settings, and/or characteristics associated with a high bandwidth scenario involving DUT 106. A "high bandwidth" user profile may be usable for achieving a high bandwidth usage rate associated with DUT 106. To provide a high bandwidth usage rate, a "high bandwidth" user profile object may include settings and configurations for emulated users to request file having large file sizes (e.g., greater than 10 MBs).

In some embodiments, a user profile object may include configurations, settings, and/or characteristics associated with a cloud service scenario involving DUT 106. A "cloud service" user profile may be usable for testing file accesses appearing to come from cloud services, such as Dropbox®. For example, WM 102 or another module may be configured to emulate a user requesting, modifying, or accessing files via a cloud service or related application.

In some embodiments, a user profile object may include configurations, settings, and/or characteristics associated with a locking scenario involving DUT 106. A "locking" user profile may be usable for testing concurrent file accesses or file locks. For example, WM 102 or another module may be configured to emulate a user attempting to read a file while another emulated user is writing to the file, to emulate a user attempting to write to a file while another emulated user is reading the file, or to emulate a user that randomly accesses or attempts to access a locked file.

In some embodiments, a locking user profile object may be configured for a portion (e.g., a subset of files) of a file system object. For example, WM user 104 may configure a file system and configure 60% of files in the file system as having locks and may configure the other files as having no locks.

In some embodiments, a user profile object may include configurations, settings, and/or characteristics associated with a negative or abnormal scenario involving DUT 106. A "negative" user profile may be usable for testing potentially dangerous (e.g., system crashing) scenarios. For example, WM 102 or another module may be configured to emulate users that requests access to a deleted file or emulate users that attempt to read from or write to a file that has no permissions.

Figure 5:
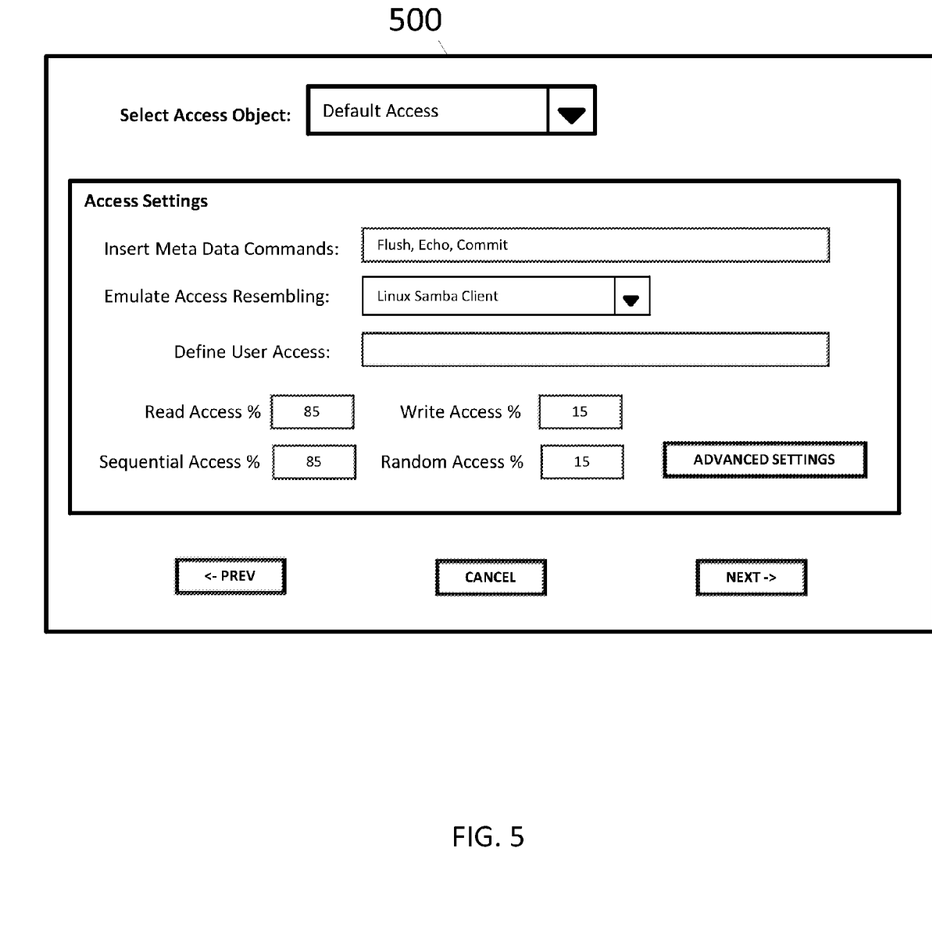
FIG. 5 is a diagram illustrating an exemplary user interface for configuring an access object according to an embodiment of the subject matter described herein.

FIG. 5 is a diagram illustrating an exemplary user interface for configuring an access object according to an embodiment of the subject matter described herein. In some embodiments, WM 102 and/or associated module or node may include a graphical user interface (GUI) for modeling a workload and/or configuring workload-related objects. In some embodiments, configuring a workload object may include configuring an access object.

Access objects may represent a variety of different interaction behaviors between an emulated user and a file system and/or associated DUT 106. For example, an exemplary access object may represent default access, client access, server access, OS-based emulation access, random I/O access, metadata access, edit/delete access, read access, or write access.

In some embodiments, an access object may represent or define a command list or a set of protocol commands usable by a file system or an emulated user. In some embodiments, an access object may also determine frequency or usage rates of one or more available commands. In some embodiments, an access object may determine whether some commands are randomly performed or sequentially performed.

In some embodiments, configuring an access object may include modifying a command list associated with WM 102 or another module that may perform workload emulation. For example, WM user 104 may configure an access object so as to perform metadata queries, to modify read and write commands, or to modify several command level parameters.

In the embodiment illustrated in FIG. 5, exemplary screenshot 500 illustrates some settings or configurations associated with configuring an access object. Screenshot 500 may depict user interface elements for selecting a profile associated with an access object. For example, a drop down menu box may allow a user to select one profile (e.g., a default access) from a plurality of predetermined (e.g., previously stored user-defined profiles or factory-set) profiles. Each profile may be associated with numerous settings or configurations. For example, after selecting "Default Access" from a drop down menu box, default values for a variety of settings may be displayed.

In some embodiments, configuring an access object may include configuring user counts, advanced timelines, command sequence generators, tokens, subscriber modeling, playlists, and other advanced features associated with an emulated user or a file system. For example, WM user 104 may configure patterns for sending or responding to control commands and/or patterns for sending or responding to metadata commands.

In some embodiments, configuring an access object may occur after a file system has been configured and after one or more user profile objects have been configured. In some embodiments, settings and/or configurations for a user profile object may be related to or based on other workload-related objects. For example, if WM user 104 configures a file system object representing an enterprise file system and configures a user profile object representing a high transaction user, then only preconfigured access objects compatible with the other workload-related objects may be available for user selection. In another example, after configuring both a file system object and a user profile object, a default access object may be configured automatically. In this example, WM user 104 may alter the default access object or select or define another compatible access object.

In some embodiments, configuring an access object may include configuring requests for data stored in sequential and/or random portions of storage devices (e.g., of DUT 106). For example, a particular access object may be configured so as that 50% of read or write commands request sequential data block offsets, while the other 50% of requests request random or non-sequential data block offsets.

In some embodiments, configuring an access object may include configuring several metadata commands to occur between other commands (e.g., read and write commands). For example, WM user 104 may select one or more metadata from a predetermined set of metadata that can be inserted in a command list.

In some embodiments, configuring an access object may include configuring attributes associated with commands or privileges associated with a file system or an emulated user. For example, an access object may be configured for allowing emulated users to delete or edit files.

In some embodiments, configuring an access object may include configuring actions to resemble certain OS systems. For example, an access object may be configured so as to perform certain commands or command parameters similar to a Samba file server, a Windows server, a Linux server, or a Mac server.

Figure 6:
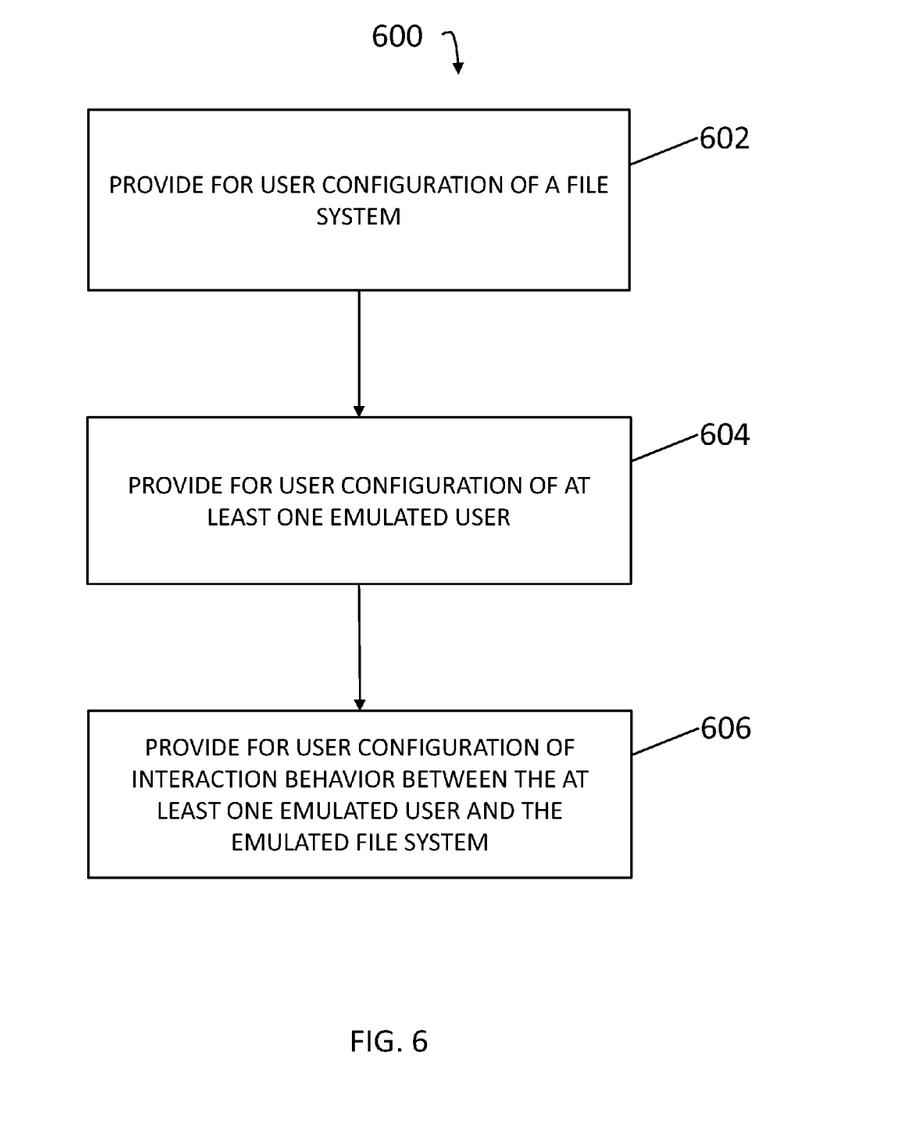
FIG. 6 is a diagram illustrating an exemplary process for modeling a workload according to an embodiment of the subject matter described herein.

FIG. 6 is a diagram illustrating an exemplary process for modeling a workload according to an embodiment of the subject matter described herein. In some embodiments, exemplary process 600, or portions thereof, may be performed by or at computing platform 100 (e.g., a network equipment test device), WM 102, and/or another node or module.

At step 602, an interface for user configuration of a file system associated with DUT 106 may be provided. For example, a network equipment test device or computing platform 100 may provide a user interface for configuring a file system associated with DUT 106 or a testing period.

In some embodiments, providing for user configuration of a file system may include providing for user configuration of a file system object. For example, a file system object may represent a file system having one or more features, settings, or configurations and/or may include software or code for creating and/or setting up the file system. In this example, when the file system object is initialized or instantiated, a file system may be created and may be installed or set up on DUT 106. The file system may include features, settings, or configurations as indicated in a corresponding file system object.

In some embodiments, providing for user configuration of a file system may include providing for user configuration of a file type distribution, a file size distribution, or a file content distribution.

At step 604, an interface for user configuration of at least one emulated user may be provided. For example, a network equipment test device or computing platform 100 may provide a user interface for configuring at least one emulated user for testing DUT 106.

In some embodiments, providing for user configuration of at least one emulated user may include providing for user configuration of a user profile object. In some embodiments, providing for user configuration of interaction behavior between at least one emulated user and a file system may include providing for user configuration of an access object.

In some embodiments, providing for user configuration of at least one emulated user may include providing for user configuration of an amount of transactions performed by the at least one emulated user, providing for user configuration of an amount of files accessed by the at least one emulated user, providing for user configuration of file size requirements for files accessed by the at least one emulated user, providing for user configuration of lock requirements for files accessible by the at least one emulated user, or providing for user configuration of cloud file accesses by the at least one emulated user.

In some embodiments, providing for user configuration of at least one emulated user may include providing for user configuration of a maximum amount of concurrent emulated users for a testing period.

At step 606, an interface for user configuration of interaction behavior between at least one emulated user and a file system may be provided. For example, a network equipment test device or computing platform 100 may provide a user interface for configuring interaction behavior between at least one emulated user and a file system for testing DUT 106.

In some embodiments, providing for user configuration of interaction behavior between at least one emulated user and a file system may include providing for user configuration of commands usable by the emulated user or the file system, providing for user configuration of metadata usable by the emulated user or the file system, providing for user configuration of sequential or random access of files associated with the file system, providing for user configuration of privileges or access rights associated with the emulated user or the file system, or providing for user configuration of actions associated with at least one operating system.

In some embodiments, a file system object, a user profile object, and an access object may be used for modeling or emulating a workload during a testing period.

In some embodiments, a file system object, a user profile object, or an access object may be selected from a plurality of stored objects.

In some embodiments, a file system object, a user profile object, or an access object may be customizable via a user interface.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for modeling a workload, the method comprising:
at a network equipment test device:
providing for user configuration of a file system associated with a device under test (DUT), wherein providing for user configuration of the file system includes providing a first user-configurable setting for indicating an operating system associated with the file system and a second user-configurable setting for indicating a particular distribution of files in the file system based on file types, file size, or storage location, wherein the files are generated by the network equipment test device using the user-configurable settings;
providing for user configuration of at least one emulated user; and
providing for user configuration of interaction behavior between the at least one emulated user and the file system, wherein providing for user configuration of the interaction behavior between the at least one emulated user and the file system includes providing for user configuration of commands usable by the emulated user or the file system, providing for user configuration of metadata usable by the emulated user or the file system, providing for user configuration of sequential or random access of files associated with the file system, providing for user configuration of privileges or access rights associated with the emulated user or the file system, or providing for user configuration of actions associated with at least one operating system.

2. The method of claim 1 wherein providing for user configuration of the file system includes providing for user configuration of a file system object, wherein providing for user configuration of the at least one emulated user includes providing for user configuration of a user profile object, and wherein providing for user configuration of the interaction behavior between the at least one emulated user and the file system includes providing for user configuration of an access object.

3. The method of claim 2 comprising
testing the DUT using the file system object, the at least one user profile object, and the access object.

4. The method of claim 2 wherein the file system object, the user profile object, and the access object are used for modeling or emulating a workload during a testing period.

5. The method of claim 2 wherein the file system object, the user profile object, or the access object is selected from a plurality of stored objects.

6. The method of claim 2 wherein the file system object, the user profile object, or the access object is customizable via a user interface.

7. The method of claim 1 wherein providing for user configuration of the at least one emulated user includes providing for user configuration of an amount of transactions performed by the at least one emulated user, providing for user configuration of an amount of files accessible by the at least one emulated user, providing for user configuration of file size requirements for files accessible by the at least one emulated user, providing for user configuration of lock requirements for files accessible by the at least one emulated user, or providing for user configuration of cloud file accesses by the at least one emulated user.

8. The method of claim 1 wherein providing for user configuration of the at least one emulated user includes providing for user configuration of a maximum amount of concurrent emulated users for a testing period.

9. A system for modeling a workload, the system comprising:
a network equipment test device comprising at least one processor and memory:
a workload module utilizing the at least one processor and the memory, wherein the workload module is configured to provide for user configuration of a file system associated with a device under test (DUT), wherein providing for user configuration of the file system includes providing a first user-configurable setting for indicating an operating system associated with the file system and a second user-configurable setting for indicating a particular distribution of files in the file system based on file types, file size, or storage location, wherein the files are generated by the network equipment test device using the user-configurable settings, to provide for user configuration of at least one emulated user, and to provide for user configuration of interaction behavior between the at least one emulated user and the file system, wherein providing for user configuration of the interaction behavior between the at least one emulated user and the file system includes providing for user configuration of commands usable by the emulated user or the file system, providing for user configuration of metadata usable by the emulated user or the file system, providing for user configuration of sequential or random access of files associated with the file system, providing for user configuration of privileges or access rights associated with the emulated user or the file system, or providing for user configuration of actions associated with at least one operating system.

10. The system of claim 9 wherein providing for user configuration of the file system includes providing for user configuration of a file system object, wherein providing for user configuration of the at least one emulated user includes providing for user configuration of a user profile object, and wherein providing for user configuration of the interaction behavior between the at least one emulated user and the file system includes providing for user configuration of an access object.

11. The system of claim 10 wherein the workload module is configure to test the DUT using the file system object, the at least one user profile object, and the access object.

12. The system of claim 10 wherein the file system object, the user profile object, and the access object are used for modeling or emulating a workload during a testing period.

13. The system of claim 10 wherein the file system object, the user profile object, or the access object is selected from a plurality of stored objects.

14. The system of claim 10 wherein the file system object, the user profile object, or the access object is customizable via a user interface.

15. The system of claim 9 wherein providing for user configuration of the at least one emulated user includes providing for user configuration of an amount of transactions performed by the at least one emulated user, providing for user configuration of an amount of files accessible by the at least one emulated user, providing for user configuration of file size requirements for files accessible by the at least one emulated user, providing for user configuration of lock requirements for files accessible by the at least one emulated user, or providing for user configuration of cloud file accesses by the at least one emulated user.

16. The system of claim 9 wherein providing for user configuration of the at least one emulated user includes providing for user configuration of a maximum amount of concurrent emulated users for a testing period.

17. A non-transitory computer readable medium comprising computer executable instructions embodied in the computer readable medium that when executed by a processor of a computer perform steps comprising:

providing for user configuration of a file system, wherein providing for user configuration of the file system includes providing a first user-configurable setting for indicating an operating system associated with the file system and a second user-configurable setting for indicating a particular distribution of files in the file system based on file types, file size, or storage location, wherein the files are generated by the network equipment test device using the user-configurable settings;

providing for user configuration of at least one emulated user; and providing for user configuration of interaction behavior between the at least one emulated user and the file system, wherein providing for user configuration of the interaction behavior between the at least one emulated user and the file system includes providing for user configuration of commands usable by the emulated user or the file system, providing for user configuration of metadata usable by the emulated user or the file system, providing for user configuration of sequential or random access of files associated with the file system, providing for user configuration of privileges or access rights associated with the emulated user or the file system, or providing for user configuration of actions associated with at least one operating system.

* * * * *

UNITED STATES PATENT AND TRADEMARK OFFICE
CERTIFICATE OF CORRECTION

PATENT NO.        : 9,524,299 B2
APPLICATION NO.   : 13/969085
DATED             : December 20, 2016
INVENTOR(S)       : Lahiri et al.

It is certified that error appears in the above-identified patent and that said Letters Patent is hereby corrected as shown below:

In the Claims

Column 16, Line 8:
Replace "memory:"
With "memory;"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*